United States Patent Office 3,510,482
Patented May 5, 1970

3,510,482
as-TRIAZINO[5,6-b]-3-AMINO INDOLES
Jan Mieczyslaw Zygmunt Gladych, Hertford, and John Harold Hunt, Theydon Bois, Essex, England, assignors to Allen and Hanburys Limited, London, England
No Drawing. Continuation-in-part of application Ser. No. 658,644, Aug. 7, 1967. This application July 16, 1968, Ser. No. 745,089
Claims priority, application Great Britain, Sept. 17, 1963, 36,551/63; Feb. 20, 1964, 7,168/64; Aug. 27, 1964, 35,190/64; July 18, 1967, 33,050/67
Int. Cl. C07d 55/06, 57/34; A61k 27/00
U.S. Cl. 260—247.5                                   8 Claims

ABSTRACT OF THE DISCLOSURE as-Triazino(5,6-b)indoles of the formula:

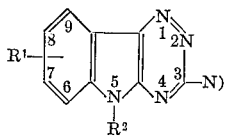

where $R^1$ is hydrogen, halogen, alkyl of 1-4 carbon atoms, hydroxy, alkoxy of 1-4 carbon atoms, nitro, amino or trifluoromethyl, $R^2$ is hydrogen, lower alkyl of 1-4 carbon atoms, benzyl or phenethyl; and N is amino, alkylamino ($NHR^3$), aralkylamino, dialkylamino ($NR^3R^3$), hydrazino, or heterocyclic amino wherein $R^3$ is straight or branched chain alkyl of 1-18 carbon atoms, provided that when N) is amino ($NH_2$) and $R^2$ is hydrogen or lower alkyl of 1-4 carbon atoms, $R^1$ is not hydrogen, bromo, chloro or nitro; the preferred heterocyclic amino groups are morpholino, piperidino, pyrrolidino, or similar monocyclic saturated nitrogen-containing ring; the preferred aralkyls are benzyl, phenethyl and phenylpropyl, exhibit antiviral activity. N-oxide derivatives with a N→O group and pharmaceutically acceptable nontoxic salts are also within the scope of the above designated compounds. Particularly valuable compounds are those substituted in the 3-position with amino moieties, preferably dimethylamino or morpholino.

---

This application is a continuation-in-part of Ser. No. 658,644, filed Aug. 7, 1967, which is a continuation-in-part of Ser. No. 396,727, filed Sept. 15, 1964, now abandoned.

The present invention is concerned with novel heterocyclic compounds. More particularly, the present invention is concerned with as-triazino(5,6-b)indoles of the general formula:

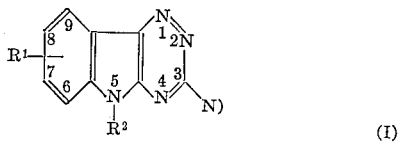

where $R^1$ is hydrogen, halogen, alkyl of 1-4 carbon atoms, hydroxy, alkoxy of 1-4 carbon atoms, nitro, amino or trifluoromethyl, $R^2$ is hydrogen, lower alkyl of 1-4 carbon atoms, benzyl or phenethyl; and N) is amino, alkylamino ($NHR^3$), aralkylamino, dialkylamino ($NR^3R^3$), hydrazino, or heterocyclic amino wherein $R^3$ is straight or branched chain alkyl of 1-18 carbon atoms, provided that when N is amino ($NH_2$) and $R^2$ is hydrogen or lower alkyl of 1-4 carbon atoms, $R^1$ is not hydrogen, bromo, chloro or nitro; the preferred heterocyclic amino groups are morpholino, pyrrolidino, or similar monocyclic saturated nitrogen-containing ring; preferred aralkyls are benzyl, phenethyl and phenylpropyl, exhibit antiviral activity.

N-oxide derivatives with a N→O group are a part of the invention as well as pharmaceutically acceptable non-toxic salts of the as-triazino(5,6-b)indoles, of the general formula shown above.

The compounds of Formula I are bases and form acid addition and quaternary ammonium salts. All conventional pharmaceutically acceptable non-toxic salts are included within the scope of the invention.

Among the compounds of the invention, there may be mentioned 3-amino-8-methoxy-as-triazino(5,6-b)indole,
3-dodecylamino-5-methyl-as-triazino(5,6-b)indole,
3-benzylamino-5-methyl-as-triazino(5,6-b)indole,
3-hexylamino-5-methyl-as-triazino(5,6-b)indole,
3-heptylamino-5-methyl-as-triazino(5,6-b)indole,
3-octylamino-5-methyl-as-triazino(5,6-b)indole,
3-decylamino-5-methyl-as-triazino(5,6-b)indole,
3-hexadecylamino-5-methyl-as-triazino(5,6-b)indole,
3-octadecylamino-5-methyl-as-triazino(5,6-b)indole,
3-(2-phenethylamino)-5-methyl-as-triazino(5,6-b)indole,
3-dimethylamino-as-triazino(5,6-b)indole,
3-dimethylamino-5-methyl-as-triazino(5,6-b)indole,
3-methylamino-5-methyl-as-triazino(5,6-b)indole,
3-ethylamino-5-methyl-as-triazino(5,6-b)indole,
3-propylamino-5-methyl-as-triazino(5,6-b)indole,
3-isopropylamino-5-methyl-as-triazino(5,6-b)indole,
3-butylamino-5-methyl-as-triazino(5.6-b)indole,
3-amylamino-5-methyl-as-triazino(5,6-b)indole,
3-isoamylamino-5-methyl-as-triazino(5,6-b)indole,
3-piperidino-5-methyl-as-triazino(5,6-b)indole,
3-dimethylamino-5-methyl-8-chloro-as-triazino(5,6-b) indole,
3-morpholino-5-methyl-as-triazino(5,6-b)indole,
lauriodide of 3-ethylamino-5-methyl-as-triazino(5,6-b) indole,
methiodide of 3-decylamino-5-methyl-as-triazino(5,6-b) indole,
bis-1,10-decamethylene diiodide of 3-methylamino-5-methyl-as-triazino(5,6-b)indole,
3-ethylamino-5-methyl-as-triazino(5,6-b)indole hydrochloride,
3-(2-phenethylamino)-5-methyl-as-triazino(5,6-b)indole hydrochloride,
3-benzylamino-5-methyl-as-triazino(5,6-b)indole hydrochloride,
3-piperidino-5-methyl-as-triazino(5,6-b)indole hydrochloride,
3-morpholino-5-methyl-as-triazino(5,6-b)indole hydrochloride,
3-dimethylamino-5-methyl-as-triazno(5,6-b)indole hydrochloride,
and 5-ethyl-3-methylamino-as-triazino(5,6-b)indole.

The compounds of Formula I may be prepared by the cyclization of isatin β-thiosemicarbazones of the general formula

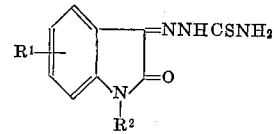

wherein $R^1$ and $R^2$ have the meanings given above, to give 3-mercapto-as-trazino(5,6-b)indoles of the general formula

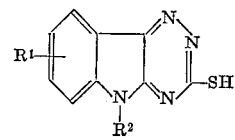

wherein $R^1$ and $R^2$ have the meanings given above and then converting the compounds of Formula III to compounds of Formula I by conventional methods.

The thiosemicarbazones of Formula II may be cyclized to give the compounds of Formula III by, for example, refluxing in the presence of ammonia or aqueous potassium carbonate. Alternatively, the thiosemicarbazones need not be isolated in which case thiosemicarbazide and the isatin of formula

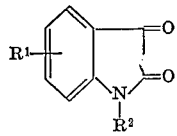

(IV)

wherein $R^1$ and $R^2$ have the meanings given above, are refluxed together in aqueous potassium carbonate solution.

Compounds of Formula I may be then prepared by reacting a 3-mercapto-as-triazino(5,6-b)indole of Formula III with an aminating agent, which may be for instance, ammonia, hydrazine, a primary amine such as an alkylamine; a secondary amine such as dimethylamine; or a heterocyclic amine such as morpholine or piperidine. A 3-methylmercapto compound may similarly be employed. The compound of Formula III may be heated, under reflux, with the aminating agent in an inert solvent such as butanol or an excess of the reacting amine may be used as the solvent. Alternatively, if the aminating agent is a low boiling amine, an alcoholic solution of it may be heated in a sealed tube with the compounds of Formula III. The latter, in the solid form, are mainly in the 3-thione structure (C=S).

The reaction of a compound of formula III with hydrazine yields a 3-hydrazino-as-triazino(5,6-b)indole. The mercapto compound may, for example, be heated with hydrazine hydrate.

Compounds in which $R^2$ is benzyl or phenethyl are prepared by using as starting material an isatin so substituted or by alkylating a compound in which $R^2$ is hydrogen with a halide such as benzyl chloride or phenethyl chloride.

If desired, the basic compounds of Formula I obtained by any of the processes given above may be quaternized or converted into their salts with inorganic or organic acids.

The isatin starting materials are either known, prepared by known methods, or disclosed in copending application Ser. No. 745,124, filed on the same day as this application and identified as Case No. JJ3 on the first page thereof.

For the purpose of further illustration of this invention, the following examples are set forth in detail below.

EXAMPLE 1

Preparation of 3-mercapto-5-methyl-as-triazino(5,6-b)indole (a) 6.0 g. of N-methylisatin thiosemicarbazone was suspended in 1.5 l. of water containing 15 ml. of ammonia solution of sp. gr. 0.880 and the mixture was boiled under reflux for 24 hours. After cooling, a small amount of insoluble material was removed by filtration and discarded. The filtrate was evaporated under reduced pressure to about one third of its volume and, after cooling, the yellow solid which separated was filtered off and recrystallized from 50% aqueous dimethylformamide, 3-mercapto - 5 - methyl - as - triazino - (5,6-b)indole was obtained, M.P. 279°–281° C.

The following compounds were prepared in a similar manner:

3-mercapto-as-triazino(5,6-b)indole, M.P. higher than 360° C.
3-mercapto-5-ethyl-as-triazino(5,6-b)indole, M.P. 294° C.
3-mercapto-5-propyl-as-triazino(5,6-b)indole, M.P. 278° C.

(b) 5 g. of N-methylisatin thiosemicarbazone was suspended in 100 ml. of water containing 4.4 g. of potassium carbonate and the mixture was boiled under reflux for 75 minutes. The orange colored solution was cooled, diluted with 100 ml. of water and acidified with acetic acid, the yellow solid which separated was filtered off and rewith water, dried at 100° C. and recrystallized from a large volume of methanol to give 3-mercapto-5-methyl-as-triazino(5,6-b)indole, M.P. 278°–282° C.

The following compounds were prepared in a similar manner:

3-mercapto-as-triazino(5,6-b)indole, M.P. higher than 360° C.
3-mercapto-5-methyl-8-chloro-as-triazino(5,6-b)indole, M.P. 315°–316° C.
3-mercapto-8-nitro-as-triazino(5,6-b)indole, M.P. higher than 350° C.
3-mercapto-8-methoxy-as-triazino(5,6-b)indole, M.P. 331° C.
3-mercapto-5-methyl-8-bromo-as-triazino(5,6-b)indole, M.P. higher than 350° C.
3-mercapto-5-methyl-8-nitro-as-triazino(5,6-b)indole, M.P. 283° C.

(c) 16 g. of N-methylisatin, 10 g. of thiosemicarbazide and 21 g. of potassium carbonate were boiled under reflux in 500 ml. of water for 7 hours. A small amount of insoluble material was removed by filtration and discarded and the filtrate was cooled and acidified with acetic acid. The solid which separated was filtered off, washed with water and dried at 100° C. to give 3-mercapto-5-methyl-as-triazino-(5(6-b)indole, M.P. 275°–281° C.

The following compounds were prepared in a similar manner:

3-mercapto-7-methoxy-as-triazino(5,6-b)indole, M.P. 309° C.
3-mercapto-5-propyl-8-chloro-as-triazino(5,6-b)indole, M.P. 270°–275° C.

EXAMPLE 2

Preparation of 3-hydrazino-5-methyl-as-triazino(5,6-b)indole 2.75 g. of 3-mercapto-5-methyl-as-triazino(5,6-b)indole was boiled under reflux for 30 minutes with 20 ml. of hydrazine hydrate. The mercapto compound rapidly dissolved giving a red solution which soon commenced to deposit yellow needles. The mixture was cooled, the product filtered off and recrystallized from ethanol to give 3-hydrazino-5-methyl-as-triazino(5,6-b)indole, M.P. 221°–223° C.

EXAMPLE 3

Preparation of 3-dodecylamino-5-methyl-as-triazino(5,6-b)indole 1 g. of 3-mercapto-5-methyl-as-triazino(5,6-b)indole and 4 g. of dodecylamine were heated together at 130° C. for 8 hours. On cooling, a solid separated. Ether was added, the solid filtered off and recrystallized from ethyl acetate, M.P. 119°–120° C.

EXAMPLE 4

Preparation of 3-benzylamino-5-methyl-as-triazino(5,6-b)indole 4.3 g. of 3-mercapto-5-methyl-as-triazino(5,6-b)indole and 11 ml. of benzylamine were heated together at 130° C. for 8 hours. The product obtained on cooling and after addition of methanol, was filtered off, recrystallized from ethanol. Colorless hexagonal plates, M.P. 224° C.

The following compounds were prepared in a similar manner:

3-hexylamino - 5 - methyl-as-triazino(5,6-b)indole, M.P. 162°–163° C.
3-heptylamino - 5 - methyl-as-triazino(5,6-b)indole, M.P. 136° C.

3-octylamino - 5 - methyl-as-triazino(5,6-b)indole, M.P. 131° C.

3-decylamino - 5 - methyl-as-triazino(5,6-b)indole, M.P. 125° C.

3-hexadecylamino - 5 - methyl-as-triazino(5,6-b)indole, M.P. 112° C.

3 - octadecylamino - 5 - methyl - as - triazino(5,6 - b) indole, M.P. 99° C.

3-(2-phenethylamino)-5-methyl-as-triazino(5,6 - b)indole, M.P. 186° C.

EXAMPLE 5

Preparation of 3-dimethylamino-as-triazino(5,6-b)indole 1 g. of 3-mercapto-as-triazino(5,6-b)indole and 20 ml. of a 33% solution of dimethylamine in ethanol were heated in a sealed tube at about 150° C. for 8 hours. After cooling, the tube was opened and the yellow crystals which had separated were filtered off and recrystallized by extraction with ethanol in a Soxhlet extractor. The product was obtained as pale yellow plates, M.P. 342° to 346° C.

Alkylation of the product in the conventional manner with benzyl or phenethyl chloride or bromide in the presence of base gives the 5-benzyl or 5-phenethyl product, respectively.

The following compounds were prepared in a similar manner to the preparation of 3-dimethylamino-as-triazino-(5,6-b)indole:

3-dimethylamino-5-methyl-as-triazino(5,6-b)indole, M.P. 170° C.

3-methylamino-5-methyl-as-triazino(5,6 - b)indole, M.P. 250° C.

3-ethylamino - 5 - methyl-as-triazino(5,6-b)indole, M.P. 213° C.

3-propylamino-5-methyl-as-triazino(5,6 - b)indole, M.P. 189° C.

3-isopropylamino-5-methyl-as-triazino(5,6-b)indole, M.P. 198° C.

3-butylamino - 5 - methyl-as-triazino(5,6-b)indole, M.P. 165° C.

3-amylamino - 5 - methyl-as-triazino(5,6-b)indole, M.P. 168° C.

3-isoamylamino-5-methyl-as-triazino(5,6 - b)indole, M.P. 187° C.

3-piperidino - 5 - methyl-as-triazino(5,6-b)indole, M.P. 180° C.

EXAMPLE 6

Preparation of 3-dimethylamino-5-methyl-8-chloro-as-triazino(5,6-b)indole 1 g. of 3-mercapto-5-methyl-8-chloro-as-triazino(5,6-b)indole and 20 ml. of a 33% solution of dimethylamine in ethanol were heated in a sealed tube at about 150° C. for 18 hours. The tube was allowed to cool and was opened. The yellow crystals which had separated were filtered off and recrystallized from methanol. The product was obtained as glistening pale yellow needles, M.P. 217°–218° C.

EXAMPLE 7

Preparation of 3-morpholino-5-methyl-as-triazino-(5,6-b)indole

A mixture of 1 g. of 3-mercapto-5-methyl-as-triazino-(5,6-b)indole and 5 ml. of morpholine was boiled under reflux for 8 hours, during which time the solid dissolved to a deep red solution and hydrogen sulphide was evolved. On cooling, a yellow solid separated. A little methanol was added and the solid was removed by filtration. Recrystallized from 25% aqueous alcohol, it had M.P. 169°–170° C.

EXAMPLE 8

Preparation of the lauriodide of 3-ethylamino-5-methyl-as-triazino(5,6-b)indole

A solution of 1.7 g. of 3-ethylamino-5-methyl-as-triazino(5,6-b)indole and 4.44 g. of lauryl iodide in 25 ml. of ethyl methyl ketone was boiled under reflux for 30 hours. After cooling and addition of ether, the precipitate, a gum, was triturated with acetone and twice recrystallized from ether containing 10% ethanol. The quaternary iodide was obtained, M.P. 150° C.

EXAMPLE 9

Preparation of the methiodide of 3-decylamino-5-methyl-as-triazino(5,6-b)indole

A solution of 2 g. of 3-decylamino-5-methyl-as-triazino(5,6-b)indole in 25 ml. of ethyl methyl ketone was boiled under reflux with 1 ml. of methyl iodide for 6 hours. The solid was filtered off, washed with acetone and recrystallized from ethanol. 1.5 g. of methiodide was obtained as golden yellow crystals, M.P. 253° C.

EXAMPLE 10

Preparation of the bis-1,10-decamethylene diiodide of 3-methylamino-5-methyl-as-triazino(5,6-b)indole A mixture of 1 g. of 3-methylamino-5-methyl-as-triazino(5,6-b)indole and 1 g. of decamethylene diiodide in 25 ml. of ethyl methyl ketone was boiled under reflux for 30 hours. After cooling, the orange solid was filtered off, and recrystallized from a mixture of two parts of ethanol and three parts of ether. The bis-quaternary salt was obtained as orange crystals, M.P. 217° C.

EXAMPLE 11

Preparation of 3-ethylamino-5-methyl-as-triazino-(5,6-b)indole hydrochloride 1 g. of 3-ethylamino-5-methyl-as-triazino(5,6-b)indole was dissolved in 20 ml. of 8% hydrogen chloride in methanol. On addition of 200 ml. of ether, the salt separated as yellow microcrystals, which after drying in vacuo, melted at 262° C.

The following compounds were prepared in a similar manner:

3-(2-phenethylamino)-5-methyl-as-triazino(5,6 - b)indole hydrochloride, M.P. 220° C.

3-benzylamino-5-methyl-as-triazino(5,6-b)indole hydrochloride, M.P. 213° C.

3-piperidino - 5 - methyl-as-triazino(5,6-b)indole hydrochloride, M.P. 222° C.

3-morpholino - 5 - methyl-as-triazino(5,6-b)indole hydrochloride, M.P. 234° C.

3-dimethylamino-5-methyl-as-triazino(5,6 - b)indole hydrochloride, M.P. 256° C.

EXAMPLE 12

Preparation of 3-amino-8-methoxy-as-triazino-(5,6-b)indole 13 g. of 5-methoxyisatin and 11 g. of aminoguanidine bicarbonate were dissolved in 150 ml. of glacial acetic acid and refluxed for one hour. The orange solid which separated on cooling, recrystallized from glacial acetic acid, gave the acetate of 5-methoxyisatin guanylhydrazone. A solution of 10 g. of 5-methoxyisatin guanylhydrazone acetate in 2 l. of water was treated with 20 ml. of ammonia [sp. gr. 0.880] and refluxed 2 hours The free guanylhydrazone which separated was redissolved by boiling and after a time a greenish yellow solid separated. On cooling, the solid was filtered off and recrystallized from aqueous dimethylformamide to give 4 g. of 3-amino-8-methoxy-as-triazino(5,6-b)indole, M.P. 335° C.

EXAMPLE 13

The following listed products are prepared by treating the corresponding listed starting materials with the appropriate amine according to the procedures described in Examples 5 and 7.

*Product.*—5-methyl-3-morpholino - 8 - trifluoromethyl-as-triazino(5,6-b)indole.

*Starting materials.*—3-mercapto - 5 - methyl - 8 - trifluoromethyl-as-triazino(5,6-b) indole and morpholine.

*Product.*—3-dimethylamino - 8 - fluoro - 5 - methyl-as-triazino(5,6-b)indole.

*Starting materials.*—3-mercapto-8 - fluoro - 5 - methyl-as-triazino(5,6-b)indole and dimethylamine.

*Product.*—8-butyl - 5 - methyl - 3 - morpholino-as-triazino(5,6-b)indole.

*Starting materials.*—8-butyl-5-methyl - 3 - mercapto-as-triazino(5,6-b)indole and morpholine.

*Product.*—3-dimethylamino - 5,8 - dimethyl - as - triazino(5,6-b)indole.

*Starting materials.*—3-mercapto-5,8 - dimethyl - as-triazino(5,6-b)indole and dimethylamine.

*Product.*—8-methoxy-5-methyl - 3 - morpholino - as-triazino(5,6-b)indole.

*Starting materials.*—8-methoxy-5-methyl-3 - mercapto-as-triazino(5,6-b)indole and morpholine.

*Product.*—8-butoxy-5-methyl - 3 - dimethylamino - as-triazino(5,6-b)indole.

*Starting materials.*—8-butoxy-5-methyl - 3 - mercapto-as-triazino(5,6-b)indole and dimethylamine.

*Product.*—8-bromo-5 - methyl - 3 - morpholino - as-triazino(5,6-b)indole.

*Starting materials.*—8-bromo-5-methyl - 3 - mercapto-as-triazino(5,6-b)indole and morpholine.

EXAMPLE 14

8-hydroxy-5-methyl-3-morpholino - as - triazino(5,6-b)indole is prepared by treating the 8-methoxy compound of Example 13 with refluxing 48% HBr for 1–2 hours in an atmosphere of nitrogen.

EXAMPLE 15

8-amino-5-methyl-3 - morpholino - as - triazino(5,6-b)indole is prepared by treating the 8-bromo compound of Example 13 with liquid ammonia in the presence of a small amount of copper and powdered cuprous chloride in a closed pressure vessel at 110° for 7–8 hours.

EXAMPLE 16

5 g. of 3-mercapto-5-methyl-as-triazino(5,6-b)indole was dissolved in 65 ml. of 10% sodium hydroxide and cooled in ice. To the red solution was added, dropwise with stirring, 30 ml. of 30% hydrogen peroxide. When the vigorous reaction had subsided, the yellow mixture was stirred for 50 minutes, then diluted with water and acidified with acetic acid. The yellow solid was filtered off and recrystallized from pyridine, M.P. 345° C.

A mixture of 1.0 g. (0.005 mole) of this 3-hydroxy compound, 4.0 ml. of POCl$_3$, and 2.0 ml. of dimethylaniline was refluxed for 0.75 hour, cooled slightly, and carefully poured into 75–100 g. of cracked ice. The brown solid was filtered off, washed with water, dried, and recrystallized from an ample quantity of ethanol to give 3-chloro-5-methyl-as-triazino(5,6-b)indole, M.P. 219.5–220.5° C.

To 22 ml. of conc. H$_2$SO$_4$ cooled to 0° C. is added 1.7 g. (0.0077 mole) of the above 3-chloro compound, followed by dropwise addition of 0.45 ml. of conc. HNO$_3$. The contents are stirred at 0° C. for 3½ hours and poured onto 100 g. of crushed ice. The precipitated solid is collected and recrystallized from dimethylformamide to give 3-chloro-5-methyl-8-nitro-as-triazino(5,6 - b)indole, M.P. 241–243° C.

Reaction of this compound with morpholine by refluxing in toluene for an hour gives 5-methyl-3-morpholino-8-nitro-as-triazino(5,6-b)indole.

The compounds of the invention possess antiviral activity. They are particularly active against rhinoviruses and have been evaluated in the tube dilution test described below.

Tube cultures of diploid human embryonic lung (WI–26) cells were obtained from Baltimore Biological Laboratories in Eagle's Minimum Essential Medium with 10% fetal calf serum.

The medium was aspirated off the cultures and replaced with 1 ml. of growth medium [Eagle's Minimum Essential Medium with nonessential amino acids, prepared as described by Eagle, Science 130, 432 (1959)] and 10% fetal calf serum. The medium of paired cultures was supplemented with 500, 100, 20 and 4 $\eta$ml. of the compound under test. Four cultures were used as untreated controls. The cultures were incubated at 34° C. in a roller drum (12 r.p.h.). After 3 days the cultures were examined microscopically for evidence of toxicity of the compound, that is, alteration in cell morphology observed in unstained cultures at 100x magnification. The maximum compound concentration providing no indication of toxicity in either of the two cultures was the maximum well-tolerated concentration.

The tube cultures described above were then used for the activity determination. Five-tenths ml. of an appropriate dilution of virus in growth medium containing 10 TCID$_{50}$ (tissue culture infective dose, that is, dose causing infection of 50% of the culture) were added to 40 cultures. Five-tenths ml. of growth medium were added to four cultures to be used as cell controls. The cultures were then incubated at 34° C. Excess virus or growth medium was removed after 1 hour and 1 ml. of growth medium was added to each culture. Four non-infected cultures used as cell controls and eight infected cultures used as virus controls were maintained in unsupplemented medium. Eight infected cultures were used to determine the antiviral activity of each compound concentration; these received, 1, 1/5, 1/25, and 1/125 WTD (well tolerated dose) of test compound diluted with the growth medium. The cultures were rolled at 34° C. The cultures were examined microscopically after four days and scored on the basis of extent of cytopathic effect. 1059, 2060, and HGP in the table below designate particular strains of rhinovirus. The results are stated as a therapeutic ratio, the maximum concentration of compound tolerated by the cultures over the minimum concentration which inhibits cell destruction by the virus.

| Comp. No. | R$^1$ | R$^2$ | N) | 1059 | HGP | 2060 |
|---|---|---|---|---|---|---|
| 1689 | H | CH$_3$ | NCH$_{12}$H$_{25}$ | 500/<4 | | |
| 1675 | H | CH$_3$ | N(CH$_3$)$_2$ | 500/100 | 500/100-20 | 500/20-100 |
| 1684 | H | CH$_3$ |  | 100/100 | 500/500-100 | 500-100/100 |

Compound 1675 is also active against vaccinia virus both in the common plaque inhibition test, and in the mouse tail infection at an oral dose of 400 mg./kg.

The compounds of the invention may be formulated for use in a manner well known to pharmaceutical chemists by combining them with standard pharmaceutical excipients to form tablets, capsules, ointments and intranasal preparations. The oral formulations may contain between 100 mgs. and 1 g. and may be administered 1–4 times daily.

The preparation of these pharmaceutical compositions is illustrated below.

EXAMPLE 17

Capsules 300 kg. of one of the compounds of this invention, for instance, 3 - dimethylamino-5-methyl-as-triazino(5,6-b)-indole, is finely divided in a comminuting mill to produce a 60 B.S. mesh powder. This powder is filled into No. 1 hard gelatin capsules so that each capsule contains 300 mg. of the active ingredient.

EXAMPLE 18

Tablets 3.00 kg. of one of the compounds of this invention, for example, 3 - morpholino - 5-methyl-as-triazino(5,6-b) indole, 300 g. of maize starch, 400 g. of lactose and 80 g. of hydrolyzed gelatin are mixed together, then sufficient distilled water is added to produce a damp cohesive mass. screen to produce 20 B.S. mesh granules. The dried granduce granules which are dried and then passed through a screen to produce 20 B.S. mesh granules. The dried granules are mixed with 300 g. of maize starch, 800 g. of microcrystalline cellulose, 60 g. of polyethylene glycol 4000 and 60 g. of magnesium stearate. The lubricated granules are compressed on a suitable tabletting machine to produce tablets each weighing 500 mg. and containing 300 mg. of 3-morpholino-5 - methyl-as-triazino(5,6-b)indole.

EXAMPLE 19

Nasal suspension 100 g. of sodium carboxymethylcellulose of medium viscosity grade, are dissolved in 5 liters of distilled water. When solution is complete, 20 g. of sodium citrate, 13 g. of potassium biphthalate, 0.1 g. of thiomersal and 2 ml. of eucalyptol are added. The mixture is stirred until solution takes place. 500 g. of one of the compounds of this invention, for instance, 3-morpholino-5-methyl-as-triazino (5,6-b)indole, is slowly dispersed in the gel, and the volume made up to 10 liters with distilled water.

We claim:
1. A compound of the formula

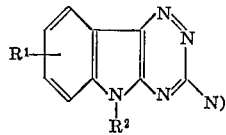

wherein $R^1$ is hydrogen, halogen, alkyl of 1–4 carbon atoms, hydroxy, alkoxy of 1–4 carbon atoms, amino or trifluoromethyl;

$R^2$ is hydrogen or lower alkyl of 1–4 carbon atoms, $R^3$ is straight or branched chain alkyl of 1–18 carbon atoms; and N) is amino, benzylamino, phenethylamino, $NHR^3$, $NR^3R^3$, hydrazino morpholino, or piperidino, with the proviso that when N) is amino, $R^1$ is not hydrogen, or halogen, or a pharmaceutical acceptable acid addition salt thereof.

2. A compound as claimed in claim 1, in which N) is $N(CH_3)_2$, $NHCH_3$, or morpholino.

3. A compound as claimed in claim 1, in which $R^1$ is at the 8-position.

4. A compound as claimed in claim 2, which is 3-dimethylamino-5-methyl-as-triazino(5,6-b)-indole.

5. A compound as claimed in claim 2, which is 3-morpholino-5-methyl-as-triazino(5,6-b)indole.

6. A compound as claimed in claim 1, which is 3-methylamino-5-methyl-as-triazino(5,6-b)indole.

7. A compound as claimed in claim 1, which is 8-methoxy - 5-methyl - 3 - morpholino-as-triazino(5,6-b)indole.

8. A compound as claimed in claim 1, which is 8-hydroxy-5-methyl-3-morpholino-as-triazino(5,6-b)indole.

References Cited

Chemical Abstracts, Sixth Collective Index, vols. 51–55, 1957–61, Subjects SP–Z, p. 11,934.

Allen & Hanburys Ltd., Chemical Abstracts, vol. 63, p. 13,295 (1965).

ALEX MAZEL, Primary Examiner

J. TOVAR, Assistant Examiner

U.S. Cl. X.R.

260—249.9; 424—248, 249